United States Patent
Sharangpani et al.

(10) Patent No.: US 6,178,498 B1
(45) Date of Patent: Jan. 23, 2001

(54) STORING PREDICTED BRANCH TARGET ADDRESS IN DIFFERENT STORAGE ACCORDING TO IMPORTANCE HINT IN BRANCH PREDICTION INSTRUCTION

(75) Inventors: Harshvardhan Sharangpani, Santa Clara; Kent Fielden, Sunnyvale, both of CA (US)

(73) Assignee: IDEA Corporation, Santa Clara, CA (US)

( * ) Notice: Under 35 U.S.C. 154(b), the term of this patent shall be extended for 0 days.

(21) Appl. No.: 08/993,450

(22) Filed: Dec. 18, 1997

(51) Int. Cl.[7] .................................................. G06F 9/38
(52) U.S. Cl. ........................ 712/239; 711/213; 712/238
(58) Field of Search ..................... 711/213; 712/238, 712/239

(56) References Cited

U.S. PATENT DOCUMENTS

| 5,313,634 | * | 5/1994 | Eickemeyer | 712/240 |
| 5,515,518 | * | 5/1996 | Stiles et al. | 712/239 |
| 5,732,242 | * | 3/1998 | Mowry | 711/136 |
| 5,742,804 | * | 4/1998 | Yeh et al. | 712/237 |
| 5,768,576 | * | 6/1998 | Hoyt et al. | 712/238 |
| 5,857,104 | * | 1/1999 | Natarjan et al. | 712/226 |

\* cited by examiner

Primary Examiner—Kenneth S. Kim
(74) Attorney, Agent, or Firm—Blakely, Sokoloff, Taylor & Zafman, LLP (57) ABSTRACT

A branch prediction instruction is provided that includes hint information for indicating a storage location for associated branch prediction information in a hierarchy of branch prediction storage structures. When the hint information is in a first state, branch prediction information is stored in a first structure that provides single cycle access to the stored information. When the hint information is in a second state, the branch prediction information is stored in a second structure that provides slower access to the stored information.

19 Claims, 7 Drawing Sheets

STORING PREDICTED BRANCH TARGET ADDRESS IN DIFFERENT STORAGE ACCORDING TO IMPORTANCE HINT IN BRANCH PREDICTION INSTRUCTION

BACKGROUND OF THE INVENTION

1. Field of the Invention

The present invention relates to the field of branch prediction, and in particular, to systems and methods for accessing prediction information related to branch instructions.

2. Background Art

Advanced processors employ pipelining techniques to execute instructions at very high speeds. On such processors, the overall machine is organized as a pipeline consisting of several cascaded stages of hardware. Instruction processing is divided into a sequence of operations, and each operation is performed by hardware in a corresponding pipeline stage ("pipe stage"). Independent operations from several instructions may be processed simultaneously by different pipe stages, increasing the instruction throughput of the pipeline. Where a pipelined processor includes multiple execution resources in each pipe stage, the throughput of the processor can exceed one instruction per clock cycle. Contemporary superscalar, deeply pipelined processors may have anywhere from 5 to 15 pipe stages and may execute operations from as many as 4 to 8 instruction simultaneously in each pipe stage. In order to make full use of a processor's instruction execution capability, the execution resources of the processor must be provided with sufficient instructions from the correct execution path. This keeps the pipeline filled with instruction that need to be executed.

The presence of branch instructions poses major challenges to keeping the pipeline filled with instructions from the correct execution path. When a branch instruction is executed and the branch condition met, control flow of the processor is resteered to a new code sequence and the pipeline is refilled with instructions from the new code sequence. Since branch execution occurs in the back end of the pipeline, and instructions are fetched at the front end of the pipeline, several pipeline stages worth of instructions may be fetched from the wrong execution path by the time the branch is resolved. These instructions need to be flushed from the pipeline, causing bubbles (idle stages) in the pipeline. The processor must then begin fetching instructions at the target address indicated by the branch instruction, and the intervening stages of the pipeline remain empty until they are filled by instructions from the new execution path.

To reduce the number of pipeline bubbles, processors incorporate branch prediction modules at the front ends of their pipelines. When a branch instruction enters the front end of the pipeline, the branch prediction module forecasts whether the branch instruction will be taken when it is executed at the back end of the pipeline. If the branch is predicted taken, the branch prediction module communicates a target address for a new code sequence to the fetch module at the front end of the pipeline. The fetch module resteers the pipeline to begin fetching instructions at the target address.

Conventional branch prediction modules employ branch prediction tables (BPTs) that track the history (taken/not taken) of branch instructions and use this information to predict whether a branch will be taken. Looking up an instruction in the BPT, determining whether the branch is taken, and resteering the fetch module to the predicted target address consume clock cycles. This delay allows instructions from the wrong execution path to enter the pipeline. Since these instructions do not add to forward progress on the predicted execution path, they create "bubbles" in the pipeline for as many clock cycles as it takes to resteer the front end of the pipeline.

Thus, currently available branch prediction techniques reduce but do not eliminate pipeline bubbles. When these bubbles occur in selected branch instructions, such as tight loops, the performance degradation can be significant. For example, if a bubble of one cycle is introduced in a loop that executes in four clock cycles, execution of the loop may be degraded by 25%.

SUMMARY OF THE INVENTION

In accordance with the present invention, a branch prediction instruction is provided to facilitate implementing branch prediction information for an associated branch instruction. The branch prediction instruction specifies a target address for the associated branch instruction and an importance hint. The importance hint indicates to processor hardware the relative importance of providing low latency branch prediction for the associated branch. The processor hardware may use the importance hint to manage a hierarchy of branch prediction structures, storing more important predictions in lower latency structures.

In one embodiment of the invention, first and second storage structures are provided to store branch prediction information for first and second categories of branch instructions, respectively. Branch prediction information for a branch instruction is stored in the first or second storage structure according to the importance hint provided by a branch prediction instruction associated with the branch instruction. The first storage structure may be a register that can be accessed in a single clock cycle and branch prediction information is stored in this structure when the importance bit in the branch prediction instruction is set.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

Figure 1A:
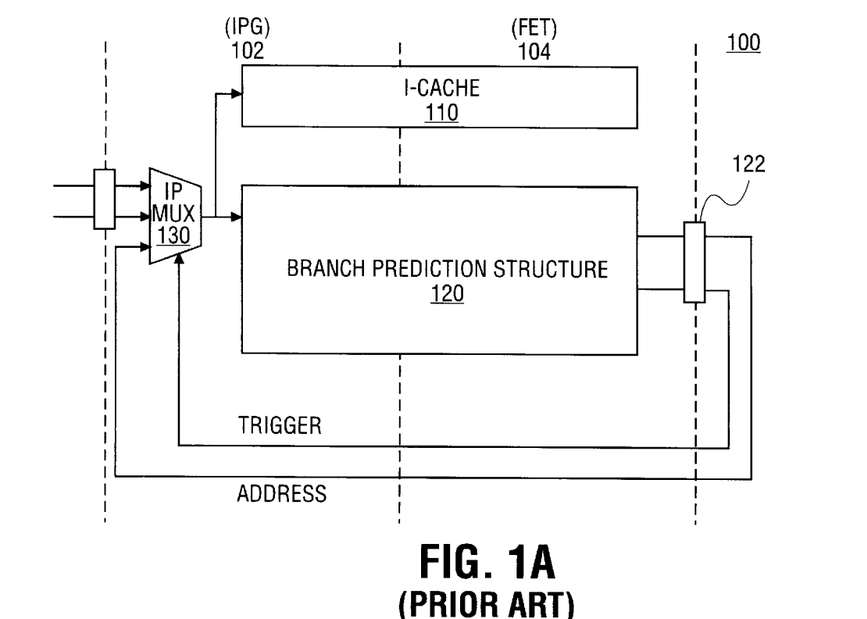
FIG. 1A is a block diagram of the front end stages of a processor pipeline including a conventional branch prediction module.

Referring first to FIG. 1A, there is shown a front end 100 of a conventional processor pipeline, including various elements that appear in an instruction pointer generation (IPG) stage 102 and an instruction fetch (FET) stage 104. Here, IP represents a pointer to the next instruction(s) to be executed by the processor. IPG stage 102 includes an IP multiplexer (MUX) 130 and portions of an instruction cache (I-cache) 110 and branch prediction module 120. Remaining portions of I-cache 110 and branch prediction module 120 extend into fetch stage 104. The positions and sizes of I-cache 110 and branch prediction module 120 relative to IPG and fetch pipeline stages 102, 104, indicate when they receive the IP and the time they require to process the received IP, respectively. For example, IP multiplexer 130 selects an IP in the first half of IP generation stage 102. I-cache 110 and branch prediction module 120 receive the IP approximately halfway through IPG stage 102 and finish processing it during FET stage 104.

IP multiplexer (MUX) 130 is coupled to receive IPs from various sources, including branch prediction module 120. Depending on inputs from branch prediction module 120 and other control circuitry (not shown), IP MUX 130 couples the IP at one of its inputs to I-cache 120 and branch prediction module 120. As noted above, IP selection by MUX 130 occurs in the first part of IP generation stage 102.

On receipt of the selected IP, I-cache 1 10 and branch prediction module 120 initiate look up procedures to fetch information related to the selected IP. In particular, I-cache 110 stores copies of selected instructions, indexed by their corresponding IPs. I-cache 110 compares the received IP with its entries to determine whether it has a copy of the corresponding instruction. When the IP hits, i.e. matches an entry, in I-cache 110, the corresponding instruction is passed to circuitry in the next stage of the pipeline (not shown). If the IP misses in I-cache 110, the instruction is retrieved by a longer latency transaction to the memory subsystem (not shown).

Branch prediction module 120 stores branch prediction information for selected branch instructions, indexed by the IPs of the branch instructions. This information includes, for example, an indication as to whether the corresponding branch is likely to be taken and a predicted target address (IP) for resteering the instruction stream if the branch is predicted taken. When the IP forwarded by IP MUX 130 hits in branch prediction module 120, the branch prediction information associated with the hit entry is accessed and read to determine whether the branch is predicted taken. If it is, the corresponding target address (IP) is coupled back to IP MUX 130 to resteer the pipeline to the code sequence beginning at the target address. A staging latch 122 controls the timing with which signals from branch prediction module 120 are coupled to MUX 130.

Figure 1B:
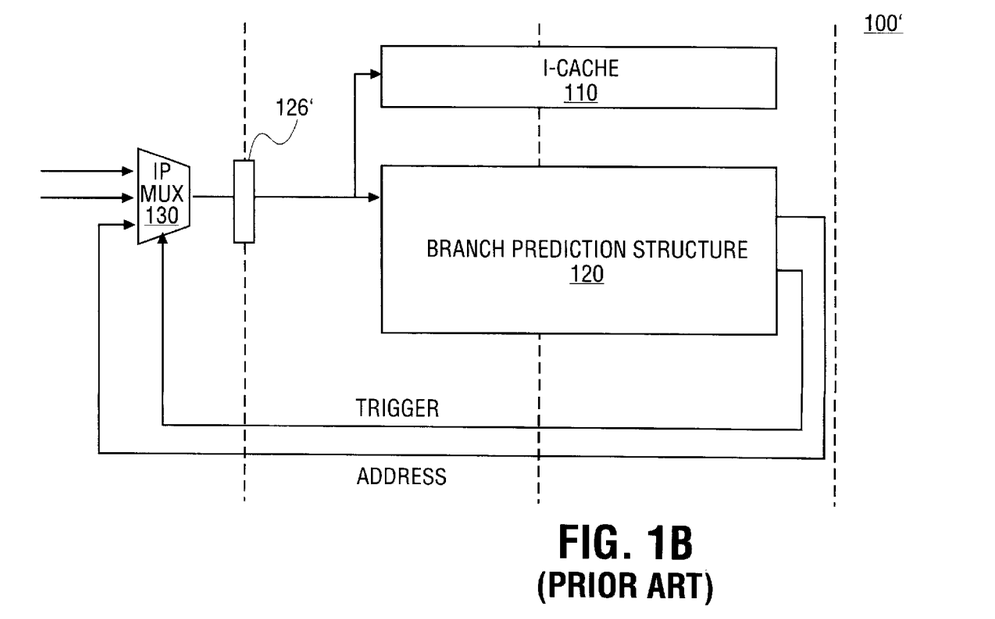
FIG. 1B is a block diagram of the processor pipeline of FIG. 1A in a modified configuration.

Referring now to FIG. 1B, there is shown an alternative configuration of pipeline 100'. In pipeline 100', signals from branch prediction module 120 are coupled to MUX 130, and a staging latch 126 at the beginning of IPG stage 102 controls the timing with which signals from MUX 130 are coupled to stage 102. The following discussion applies to either configuration of the pipeline.

Branch instructions are relatively common in computer code, occurring on average once every 5 to 9 instructions. In order to accommodate prediction information for a reasonable portion of these branch instructions, branch prediction module 120 must be a relatively large structure. The size of branch prediction module 120 is limited by timing considerations in pipeline 100. In particular, if branch prediction module 120 is too large, it will have a correspondingly longer access time. For each clock cycle required by branch prediction module 120 to access its data on a branch that is predicted taken, an additional instruction(s) from the wrong execution path ("bubble") enters pipeline 100. For this reason, branch prediction module 120 is typically sized so that pipeline 100 can be resteered in a few clock cycles following a branch instruction. There is thus a trade off in conventional branch prediction strategies between providing rapid resteering of the processor pipeline and accommodating branch prediction information for the relatively large number of branches present in most computer code.

The significance of even a single bubble in pipeline 100 can be demonstrated for a branch instruction in a code loop. Multiply accumulate (MAC) operations on blocks of data are relatively common, particularly in graphics applications. A MAC operation on variables B and D may be represented as A←B·C+D, where C is typically a constant for each loop. Pseudo code for evaluating the expression is as follows:

| TARGET | load |
|---|---|
| | load |
| | mac |
| | store |
| | branch (condition, TARGET) |

For each iteration of the loop, the two load instructions move the values of B and D into designated registers, the mac instruction performs the multiply accumulate operation using B, D, and C (stored in another register), the store instruction moves the result ("A") to a register, and the branch instruction determines whether the loop condition has been met, e.g. whether there is more data in the block to be processed. If there is, the instruction path is resteered to the instruction at the pointer, TARGET.

Load instructions and to a lesser degree store instructions have relatively long latencies, which can be hidden by technique called loop unrolling or software pipelining. Here, the compiler arranges the loop instructions so that operands from different loop iterations are executed concurrently. For example, if load instructions have a three cycle latency and store instructions have a one cycle latency, Loop I may be unrolled as follows:

| TARGET | load (i + 3) |
|---|---|
| | load (i + 3) |
| | fmac (i) |
| | store (i – 1) |
| | branch (condition, TARGET) |

In this case, if the branch instruction introduces even a single bubble on each iteration of the loop, the processor's performance on this loop will be degraded by 20%. Branch prediction structure 120 requires at least two clock cycles to provide a predicted IP to MUX130. This introduces at least one bubble into pipeline 100 on resteers. If the processor has resources to execute all five instructions in parallel, a single bubble resteer operation will degrade performance by 100%.

Loop I is just one example of the type of branch instruction that can significantly degrade the performance of a processor, even if the processor uses highly sophisticated branch predication module. As the above example indicates, tight loops with large repetition counts can significantly degrade processor performance even where branch prediction module 120 resteers the pipeline in two clock cycles.

The present invention enables zero bubble resteering of the pipeline for selected branch instructions by supporting the use of a hierarchy of branch prediction structures. Branch prediction information for selected branches is earmarked for storage in the structure having the fastest access time. In one embodiment of the invention, a first branch prediction structure provides single cycle access to branch prediction information and is used to store branch prediction information for a select category of branch instructions. A second, larger branch prediction structure accommodates branch prediction data for branch instructions that do not fall in the select category. Additional levels of branch instruction hierarchy and corresponding branch prediction structures may be added as needed.

Branch prediction information is distributed among the structures according to an importance field specified in a branch prediction instruction. An n-bit importance field accommodates a 2" level hierarchy of branch instructions and their corresponding branch prediction information.

Generally, providing branch prediction information early in the processor pipeline facilitates rapid fetch and subsequent execution of instructions along the appropriate instruction path. This strategy is beneficial as long as the structures that store this information do not load critical paths in the processor pipeline or become so unwieldy as to introduce unnecessary pipeline bubbles into frequently taken inner loop branches. By providing a hierarchy of structures for storing branch prediction information, the present invention promotes the use of branch prediction information for all branch instructions without impeding access to branch prediction information for a critical category of branch instructions.

Figure 2A:
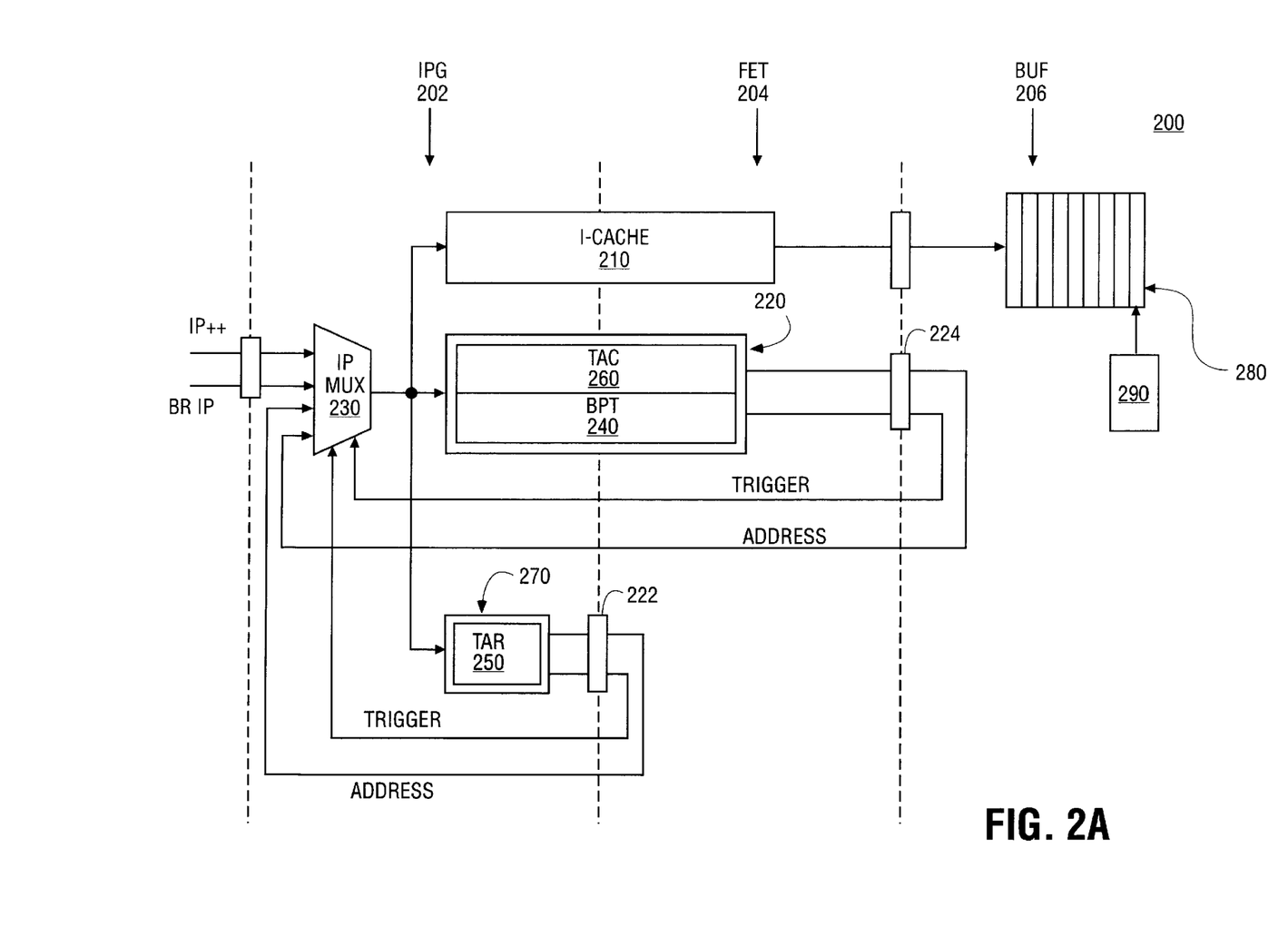
FIG. 2A is a block diagram of the front end stages of a processor pipeline including branch prediction structures suitable for use with the present invention.

Referring now to FIG. 2A, there is shown a block diagram of a front end pipeline 200 including an IP generation stage 202 and a fetch (FET) stage 204 suitable for implementing the present invention. Also shown is an instruction buffer stage 206, including an instruction buffer 280. Except as noted, signals propagate in FIG. 2A from left to right, so that the response of circuitry in pipe stage 202 on CLK cycle N is propagated to the circuitry of pipe stage 204 on CLK cycle N+1. The notable exceptions are the trigger and address signals generated in fetch stage 204.

An IP MUX 230 is coupled to an Instruction-cache (I-cache) 210, a first branch prediction structure (BPS) 270, and a second branch prediction structure (BPS) 220. In the disclosed embodiment, BPS 220 includes a branch prediction table (BPT) 240 and a target address cache (TAC) 260, while BPS 270 includes a target address register (TAR) 250. IPs from various sources are applied to the inputs of IP MUX 230, which couples one of the IPs to its output according to a signal at its control input. The selected IP is coupled to I-cache 210, BPS 220, and BPS 270 in IP generator stage 202. Predicted IP (address) and trigger outputs from TAR 250 are coupled back to an input and a control terminal, respectively, of IP MUX 230 through staging latch 222. Predicted IP (ADDRESS) and TRIGGER outputs from TAC 260 and BPT 240 are coupled back to an input and a control terminal of IP MUX 230 through staging latch 224.

Figure 2B:
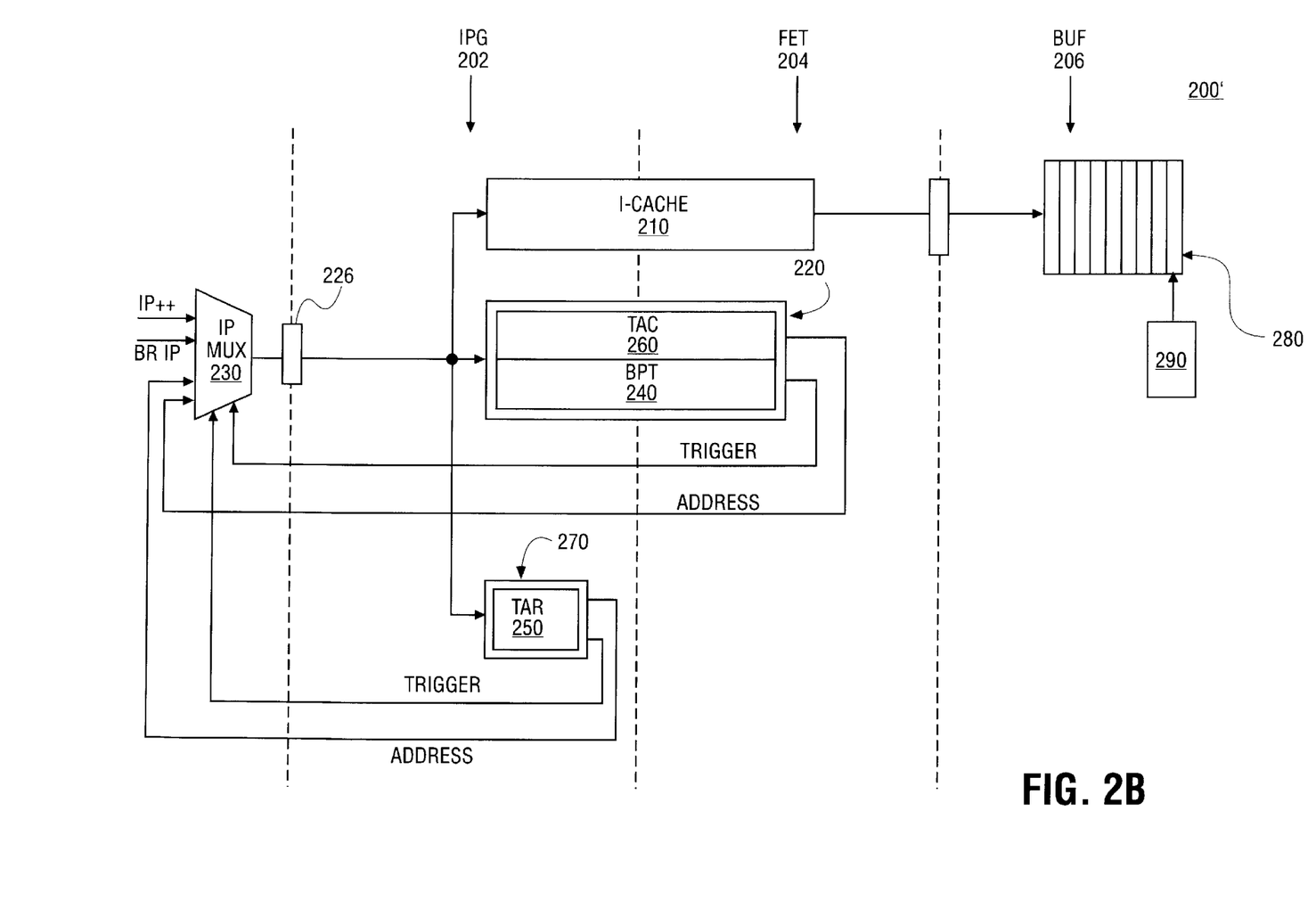
FIG. 2B is a block diagram of the processor pipeline of FIG. 2A in a modified configuration.

An alternative configuration of pipeline 200 (pipeline 200') is shown in FIG. 2B. In the alternative configuration, outputs from BPSs 220, 270 are coupled back to IP MUX 230 in a stage that precedes IPG stage 202, and a staging latch 226 couples the output of IP MUX 230 to IPG stage 202. The present invention is independent of which of the pipeline configurations is employed, and the following discussion applies equally to the configurations of FIG. 2A and FIG. 2B.

As in FIGS. 1A and 1B, the extent of branch prediction structures 220, 270 with respect to IP generation stage 202 and fetch stage 204 indicate the time required by each structure to process the received IP. As discussed in greater detail below, TAR 250 is designed to respond to a received IP and provide its response to a branch selection MUX 240 before IP generation stage 202 concludes. This provides single cycle latency for branch prediction. The larger sizes of BPT 240 and TAC 260 prevent them from responding until fetch stage 204 is partially completed. This results in two clock cycles of branch prediction latency. Thus, while the outputs of BPSs 220, 270 are coupled back to IP MUX 230 in IP generation stage 202, those of BPS 220 represent responses of BPT 240 and TAC 260 that are generated a full clock cycle after those of BPS 270 (TAR 250).

Upon receipt of the IP, I-cache 210, BPT 240, TAR 250 and TAC 260 perform their respective look up procedures to determine whether they have an entry corresponding to the received IP. Operation of I-cache 210 on an IP hit/miss is largely as described for I-cache 110 in FIG. 1A. When an IP hits, e.g. matches an entry, in I-cache 210, data at the associated entry (the instruction pointed to by the IP) is forwarded to the next stage in pipeline 200.

BPT 240 and TAC 260 provide branch prediction information (TRIGGER, ADDRESS, respectively) for a branch instruction that hits in BPS 220. BPT 240 and TAC 260 are designed to accommodate branch prediction information for a relatively large number of branch instructions. TAR 250 provides branch prediction information (TRIGGER, ADDRESS) for a branch instruction that hits in BPS 270. In one embodiment of pipeline 200, IP MUX 230 allows the trigger signal from TAR 250 to override the trigger signal from BPT 240.

TAR 250 is designed to access data and provide it to IP MUX 230 in a single cycle when an IP provided by MUX 230 hits in TAR 250. This is indicated by the extent of BPS 270 in FIGS. 2A and 2B, which falls completely within IP generator stage 202. Second branch prediction structure 220 is accessed at approximately the same time in IP generator stage 202 as first branch prediction structure 270. For the reasons discussed above, BPS 220 is sufficiently large that it cannot access its stored data until fetch stage 204 of pipeline 200 has commenced.

In order to provide fast responses, TAR 250 accommodates branch prediction information for a limited number of branch instructions. In one embodiment of the invention, TAR 250 stores branch prediction information for four branch instructions (BR) in four, fully associative entries that are indexed by partial address (IP) tags. Branch prediction information associated with each entry includes a predicted branch target address (ADDRESS) and an indication of whether the branch is predicted taken (TRIGGER). As discussed below, branches that hit in TAR 250 are typically those predicted taken. In this case, TRIGGER is asserted to IP MUX 230 to select the ADDRESS from TAR 250 when an IP hits in TAR 250.

Branch Prediction information is distributed between BPSs 220, 270 through branch prediction instructions (BPR)

according to an importance bit(s) in the BPRs. As discussed below, the importance bit(s) is set according to properties of a BR instruction with which the BPR instruction is associated. In one embodiment of the invention, branch prediction information for a BR instruction is provided to BPS 270 when the importance bit in the associated BPR instruction is set, and it is provided to BPS 220 when the importance bit is not set.

Due to the small size of TAR 250, branch prediction information in a BPR instruction is tagged for storage in TAR 250 where the associated BR instruction meets one or more criteria. In particular, the selected BR instructions are those that are likely to have a significant impact on processor performance. For example, TAR 250 provides efficient resteering of pipeline 200 when a branch is taken. Accordingly, in one embodiment of the invention, selected BR instructions, i.e. those for which the importance bit(s) in their associated BPR instructions are set, are BR instructions that are predicted taken. Since BPR instructions are typically generated by a compiler, BR instructions that can be predicted taken based on information available at compile time, i.e. BR instructions predicted static-taken, are suitable candidates for having their branch prediction information stored in TAR 250.

The impact of non-zero bubble resteers on processor performance is magnified where the BR instruction is repeatedly accessed, as for example in Loop I. Therefore, BR instructions appearing in counted or modulo-scheduled loops are suitable candidates for having their prediction information stored in TAR 250.

In sum, the benefits from zero bubble resteers for taken BR instructions are enhanced by identifying those BR instructions most likely to impact processor performance and using a BPR instruction to store their branch prediction information in BPS 270. BPS 220 is a larger storage structure that supports single and higher bubble resteers for taken branches. BR instructions for which BPS 220 provides branch prediction information are those that are less critical to processor performance than the BR instructions associated with BPS 270. BPS 220 may also accommodate branch prediction information that has been displaced from BPS 270 by subsequent BPR instructions. The availability of BPS 220 thus allows BPR instructions to be widely used without degrading branch prediction speed/accuracy for BR instructions that appear in performance-critical code segments.

In one embodiment of the invention, BPS 220 is capable of storing branch prediction information for 64 entries in a four way set associative configuration. For these BR instructions, the associated BPR instruction provides trigger information to BPT 240 and predicted target information to TAC 260. When a BR instruction provided by IP MUX 230 on clock cycle N (IP generator stage 202) hits in BPS 220, the corresponding branch prediction data is not available from BPT 240 and TAC 260 until clock cycle N+1(fetch stage 204), at which time it is coupled back to IP MUX 230 for processing in IP generator stage 202 at clock cycle N+2. A hit in BPS 270 on clock cycle N, on the other hand, provides a predicted branch target to IP MUX 230 by clock cycle N+1, i.e. in time for a zero bubble resteer.

Figure 3:
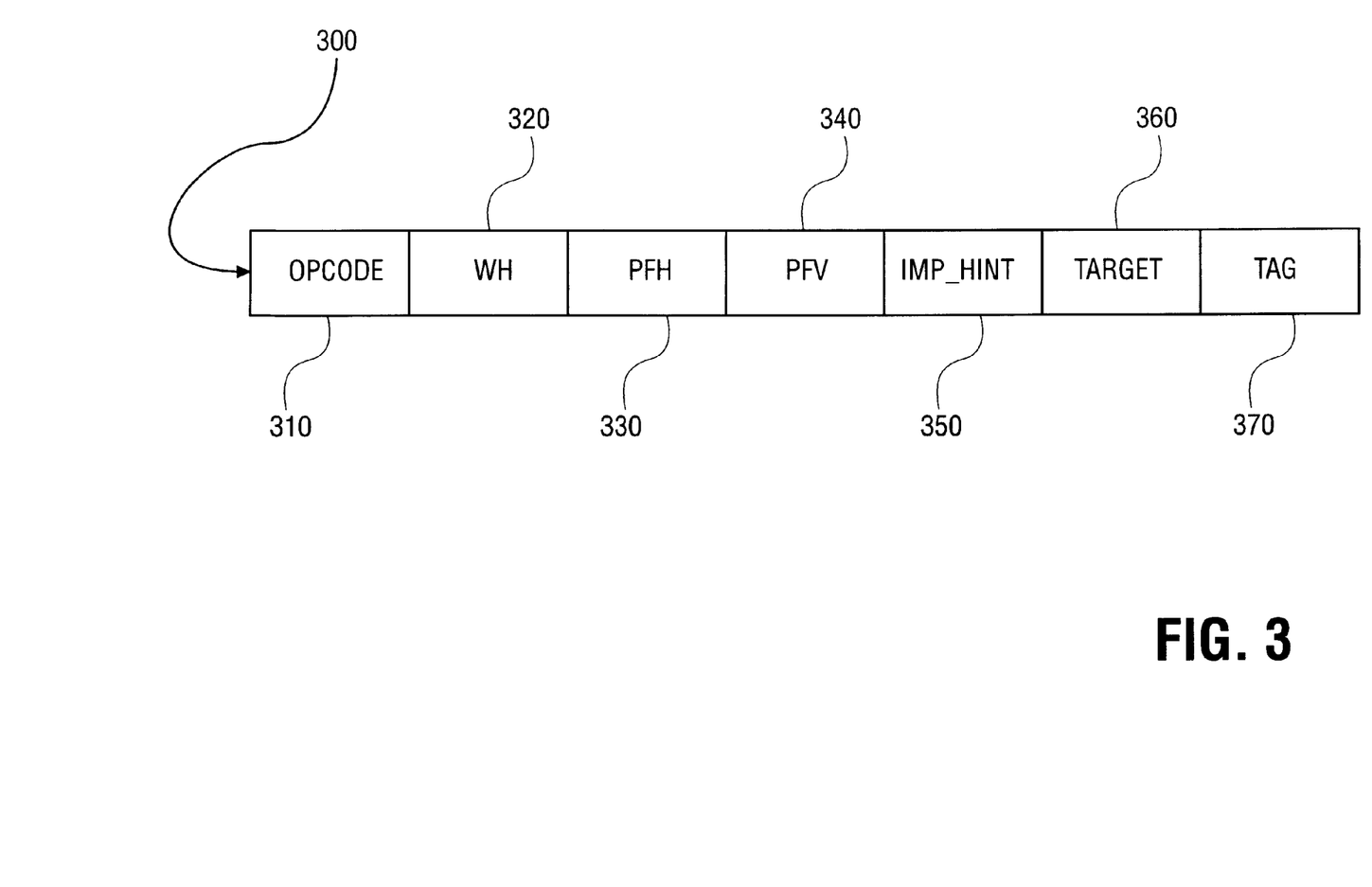
FIG. 3 is a block diagram of an embodiment of a branch prediction instruction in accordance with the present invention.

Referring now to FIG. 3, there is shown a block diagram of one embodiment of a branch prediction instruction (BPR) 300 suitable for use in the present invention. BPR 300 includes an opcode field 310, a "whether" field 320, an importance hint field 350, a target field 360, and a tag field 370. Opcode field 310 indicates that the instruction is a branch prediction instruction. Whether field 320 indicates how the branch should be predicted, e.g. dynamically. Tag field 370 indicates an address of the associated branch instruction (BR), and target field 360 indicates a predicted target address for the BR instruction. Importance hint field 350 indicates the relative importance of providing low latency branch prediction for the associated branch. In the disclosed embodiment of the invention, processor hardware uses importance hint field 350 to determine a preferred storage structure in the branch prediction storage structure hierarchy.

The disclosed embodiment of BPR 300 also includes optional fields that may be used to increase the information content of BPR 300. Optional fields include a prefetch hint field 330 and a prefetch vector field 340, although these are not necessary for the present invention. Prefetch hint field 330 indicates how many instructions should be prefetched if the branch is predicted taken. Prefetch vector field 340 provides information on branch instructions between BPR 300 and its associated BR.

Figure 4:
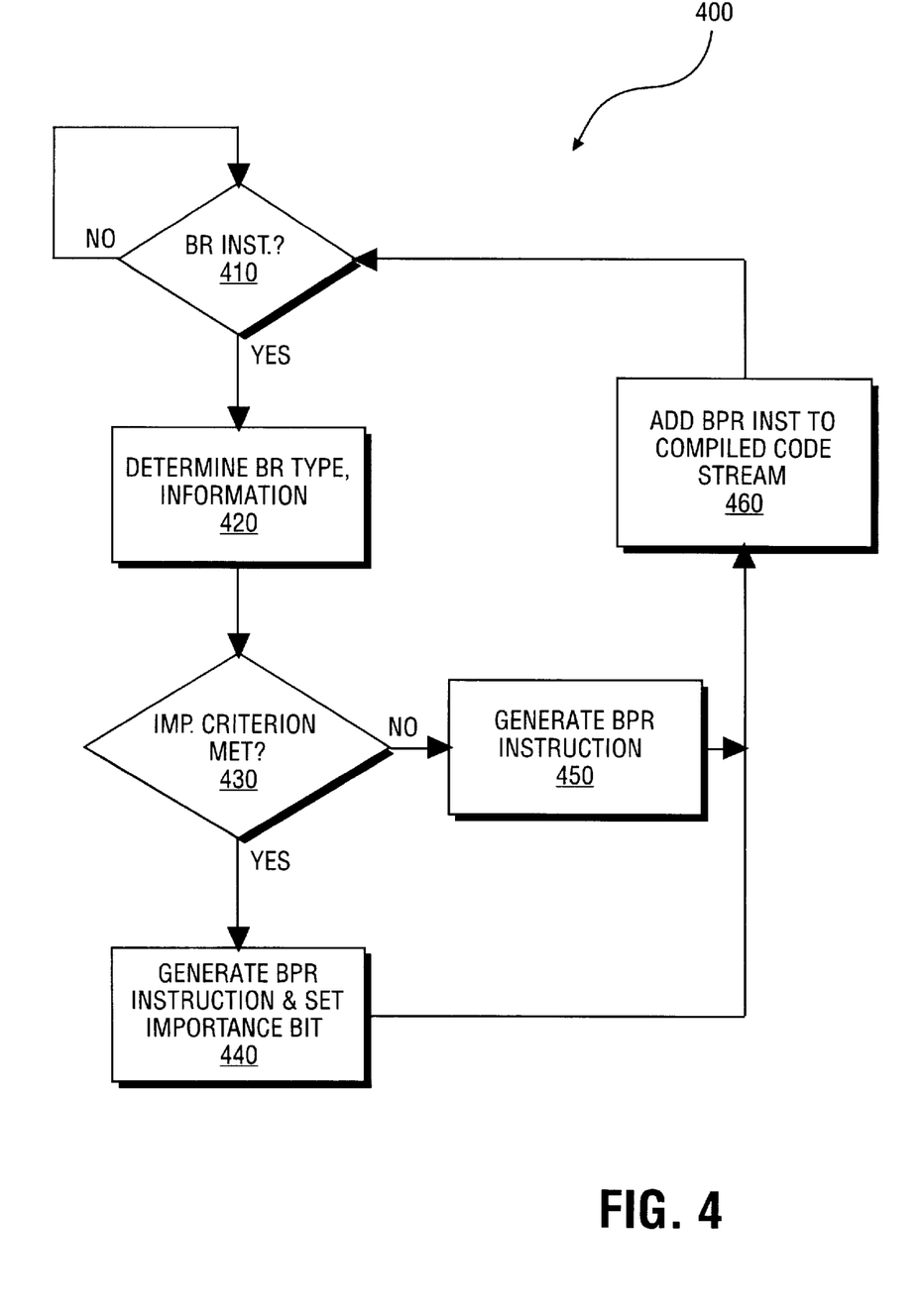
FIG. 4 is a flowchart of a method for generating branch hint information in accordance with the present invention.

Referring now to FIG. 4, there is shown a flowchart of a method 400 for generating instruction prediction information for a BR instruction, in the form of an associated BRP instruction. Method 400 is typically carried out by a compiler.

Method 400 is initiated when the compiler detects 410 a BR instruction in a code segment being analyzed. The compiler determines 420 the type of BR instruction and selected information for estimating the performance impact of the instruction. Types of branches include conditional branches, condition procedure calls and returns, counted loop branches, modulo-scheduled counted loops (Loop I), and modulo-scheduled while loops.

The compiler may determine the information for step 420 using various methods. For example, path profiling can identify frequently recurring execution paths through the code. These in turn provide insights into whether and under what circumstance branches are taken, the number and frequency of loop executions, and the like. Alternatively, performance impact information may be determined largely from the branch type. For example, counted loops and module-scheduled while loops may be assigned to a higher importance category. Loop size criteria may also be applied.

The information from step 420 is used to determine 430 whether the BR instruction meets an importance criterion, i.e. whether the BPR instruction should store branch prediction information for the BR instruction in first or second branch prediction structures 220, 270, respectively. For example, branch instructions in counted or modulo-scheduled loops that can be predicted taken on the basis of information available at compile time, e.g. static taken branches, may be selected for storage in TAR 250.

The compiler generates 440 a BPR instruction, including information from step 420, and sets an importance bit in the BPR instruction if the importance criterion is met. If the importance criterion is not met, the compiler generates 442 a BPR instruction that includes information from step 420 but does not have the importance bit set. The BPR is then added to the compiled instruction stream at a location suitable for providing advanced branch prediction information to the processor for the corresponding BR instruction.

Figure 5:
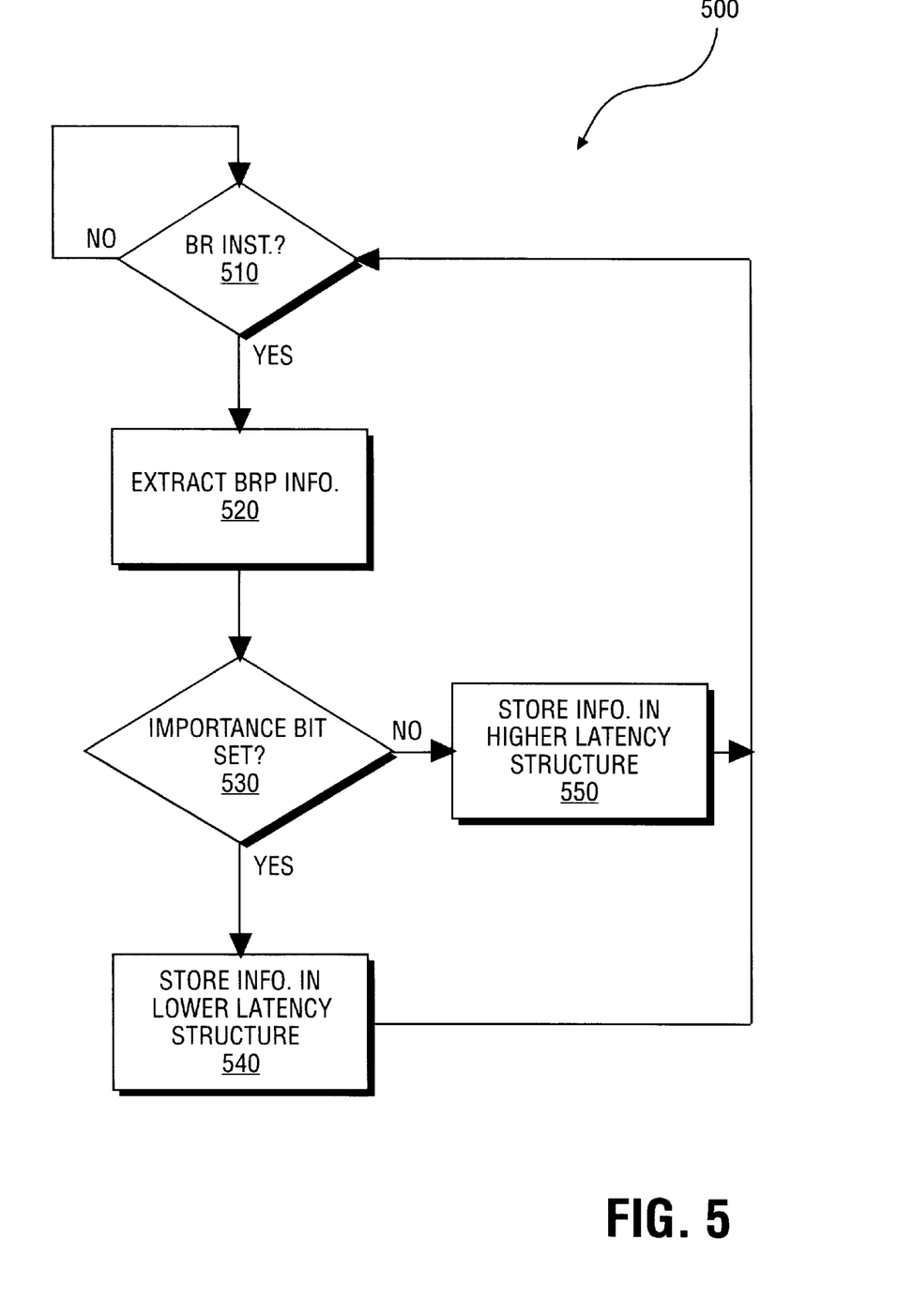
FIG. 5 is a flowchart of a method for storing branch prediction information in accordance with the present invention.

Referring now to FIG. 5, there is shown a flowchart of a method 500 for storing branch prediction information in accordance with the present invention. In the disclosed embodiment of the invention, method 500 may be initiated in buffer stage 206 of FIGS. 2A, 2B, using branch decode module 290 to identify and decode BPR instructions in buffer 280. When a BPR instruction is detected 510, branch prediction information included with the BPR is extracted 520 and it is determined 530 whether the importance bit in the BPR instruction is set. If it is determined 530 that the importance bit is set, branch prediction information is stored in the lowest latency branch prediction structure, e.g. BPS 270. If the importance bit is not set 530, the branch prediction information is stored in a higher latency branch prediction structure, e.g. BPS 220.

In some instances, BR instructions closely follow their associated BPRs through the processor pipeline, and there may be insufficient time to store the branch prediction information from the BPR prior to fetching the associated BR instruction. In these cases, the branch prediction information may be coupled directly to IP MUX 230 through bypass structures (not shown). The hint bit indicates the TRIGGER and ADDRESS lines through which the bypassed prediction information is coupled to MUX 230.

Figure 6:
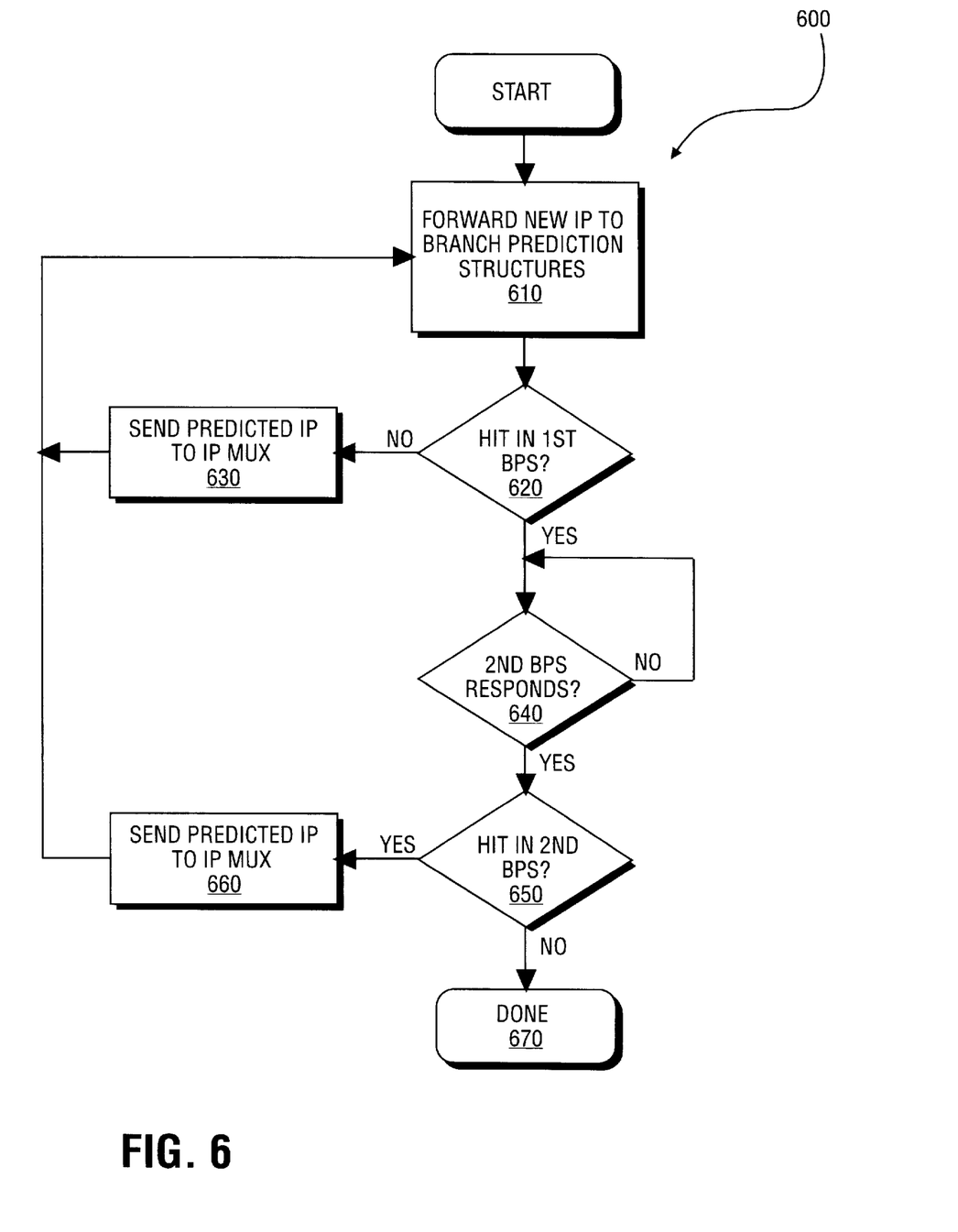
FIG. 6 is a flowchart of a method for implementing branch hint information in accordance with the present invention.

Referring now to FIG. 6, there is shown a flowchart of a method 600 for using branch prediction information in accordance with the present invention. Method 600 is initiated when a new IP is sent 610 to the branch prediction structures in IP generation stage 202 during a first clock cycle. If the IP hits 620 an entry in second branch prediction structure 220, a predicted target IP associated with the entry is returned to IP generation stage in time for the next clock cycle. If the IP misses 620 in second branch prediction structure, method 600 waits 640 for a response from BPS 220.

When BPS 220 responds, it is determined 650 whether the response indicates a hit. If the IP hits, a target IP associated with the hit entry is returned to the IP generation stage. A miss in BPS 220 (following a miss in BPS 270) indicates that the IP does not correspond to a BR instruction or there is no branch prediction information available for the BR instruction.

The present invention has been described for a system in which branch instructions are indexed by their corresponding instruction pointers (IP). However, this is not necessary, and a number of representations may be used for the branch instruction for this purpose, including, for example, the branch instruction opcode. In addition, the invention has been described for the case of a branch prediction hierarchy that includes two branch prediction structures. Those skilled in the art will recognize that the invention is readily applicable to branch prediction hierarchies having more than two levels of branch prediction structures. In these cases, BPR instructions will employ correspondingly larger hint fields and additional categories will be provided for the BR instructions.

There has thus been provided a system and method for speeding branch prediction operations, using a hierarchy of branch prediction structures. Branch prediction information for a first category of branch instructions is stored in a small, fast branch prediction structure that can be accessed in a single clock cycle. Branch prediction information for another category of branch instructions is stored in a larger, slower branch prediction structure. Branch instructions are assigned to the first and second categories. When a branch instruction hits in the first structure, a target IP is provided to the first stage of the pipeline in the clock cycle following the one in which the branch instruction began. The disclosed invention provides single cycle turnaround of branch predictions for the most significant branches, even for processors that run at high frequencies.

What is claimed is:

1. A method storing branch information comprising:
   detecting a branch prediction instruction (BRP);
   extracting an indication of a predicted target address from the BRP;
   storing the indication in a first branch prediction structure if an importance bit in the BRP is set; and
   storing the indication in a second branch prediction structure if the importance bit is not set.

2. The method of claim 1, wherein the first branch prediction structure provides low latency access to stored data and storing the indication in the first structure comprises storing the indication in an entry of the first branch prediction structure.

3. The method of claim 1, wherein the first branch prediction structure provides single cycle access to stored data and storing the indication in the first branch prediction structure comprises storing the indication in an entry of the first branch prediction structure.

4. The method of claim 1, wherein the second branch prediction structure provides higher latency access to stored data than the first branch prediction structure and storing the indication in the second branch prediction structure comprises storing the indication in an entry of the second branch prediction structure.

5. The method of claim 4, wherein the second structure provides two cycle access to the stored information and storing the indication in the second branch prediction structure comprises storing the indication in an entry of the second structure.

6. The method of claim 5, wherein a branch prediction table is associated with the second branch prediction structure, the method further comprises storing a taken/not taken prediction in an entry of the branch prediction table associated with the entry of the second structure.

7. A method for storing branch prediction information comprising:
   reading a value in an importance field in a branch prediction instruction (BRP);
   reading an indication of a predicted branch target address from a target field of the BRP; and
   storing the indication in one of a plurality of branch prediction structures according to the value read from the importance field.

8. The method of claim 7, wherein reading comprises:
   detecting the BRP; and
   reading the value in the importance field in the detected BRP.

9. The method if claim 7, wherein the value read from the importance field is a first value or a second value.

10. The method of claim 9, wherein storing comprises storing the indication in a first or a second branch prediction structure according to whether the read value is the first or second value, respectively.

11. A machine readable medium on which are stored instructions that may be executed to implement a method for storing branch prediction information, the method comprising:
   reading an importance field in an instruction;
   reading an indication of a predicted branch target address from a target field of the instruction; and
   storing the indication in one of a plurality of branch prediction structures according to a value read from the importance field.

12. The machine readable medium of claim 11, wherein storing comprises:
   storing the indication in a first branch prediction structure if the read value is one; and
   storing the indication in a second branch prediction structure if the read value is zero.

13. The machine readable medium of claim 11, further comprising storing an indication of a taken/not taken prediction in the second branch prediction structure if the read value is zero.

14. A machine readable medium on which are stored instructions that may be executed to implement a method for processing branches, the method comprising:

reading an indication of a predicted branch target address;

storing the indication in one of a plurality of branch prediction structures according to an importance hint associated with the predicted branch target address; and retrieving the stored indication in response to a branch instruction associated with the predicted branch target address.

15. The machine readable medium of claim 14, wherein storing the indication comprises storing the indication in a first or a second branch prediction structure according to whether the importance hint has a first or a second value, respectively.

16. The machine readable medium of claim 15, further comprising storing a taken/not taken prediction in the second branch prediction structure when the importance hint has the second value.

17. A method for handling branch prediction information comprising:

detecting a branch in a code sequence;

assessing importance criteria for the branch;

generating a branch prediction instruction for the branch, the branch prediction instruction including an indication of a predicted target address for the branch; and setting an importance field in the branch prediction instruction according to the importance criteria.

18. The method of claim 17, wherein assessing the importance criteria comprises:

determining a branch type for the branch; and predicting a taken/not taken status for the branch.

19. The method of claim 18, wherein setting an importance field comprises:

setting the importance field to a first value when the branch type indicates a loop type branch and the predicted status is taken.

* * * * *